United States Patent
Sabahi

Patent Number: 5,648,018
Date of Patent: Jul. 15, 1997

[54] ESTER/POLYOLEFIN REFRIGERATION LUBRICANT

[75] Inventor: Mahmood Sabahi, Baton Rouge, La.

[73] Assignee: Albemarle Corporation, Richmond, Va.

[21] Appl. No.: 555,938

[22] Filed: Nov. 13, 1995

Related U.S. Application Data

[63] Continuation-in-part of Ser. No. 371,714, Jan. 12, 1995, abandoned.

[51] Int. Cl.$^6$ .......................... C09K 5/04; C10M 129/72
[52] U.S. Cl. ........................ 252/68; 252/68; 508/496; 508/499
[58] Field of Search ........................ 252/68; 508/496, 508/499

[56] References Cited

U.S. PATENT DOCUMENTS

| | | | |
|---|---|---|---|
| 4,175,047 | 11/1979 | Schick et al. | 508/485 |
| 4,199,461 | 4/1980 | Olund | 252/68 |
| 4,800,030 | 1/1989 | Kaneko et al. | 508/423 |
| 4,968,453 | 11/1990 | Wada et al. | 508/499 |
| 4,992,183 | 2/1991 | Beimesch et al. | 508/499 |
| 5,021,179 | 6/1991 | Zehler et al. | 252/68 |
| 5,347,043 | 9/1994 | Sabahi et al. | 560/190 |
| 5,370,812 | 12/1994 | Brown | 252/68 |
| 5,391,312 | 2/1995 | Senaratne et al. | 508/469 |
| 5,399,279 | 3/1995 | Sabahi et al. | 252/68 |
| 5,431,835 | 7/1995 | Katafuchi et al. | 252/68 |
| 5,538,661 | 7/1996 | Dawson et al. | 252/68 |

FOREIGN PATENT DOCUMENTS

| | | |
|---|---|---|
| 0556662 | 8/1993 | European Pat. Off. |
| 0557796 | 9/1993 | European Pat. Off. |
| WO93/13188 | 7/1993 | WIPO |

*Primary Examiner*—Alan Diamond
*Attorney, Agent, or Firm*—Philip M. Pippenger

[57] ABSTRACT

Hydrogenated oligomers of $C_4$–$C_{20}$ $\alpha$-olefins are used in minor amounts to improve the lubricity of ester oils corresponding to the formula $ROOC-CH_2CH_2-(ROOC-CHCH_2)_m-C(COOR)_2-(CH_2CHCOOR)_n-CH_2CH_2COOR$ in which the R's represent alkyl groups of 1–30 carbons, each of m and n is zero or a positive integer, and the sum of m and n in the molecules is an average of 0–30. The improved ester oils are particularly valuable for use as lubricants in refrigeration compositions containing fluorohydrocarbon refrigerants.

19 Claims, No Drawings

ESTER/POLYOLEFIN REFRIGERATION LUBRICANT

CROSS-REFERENCE TO RELATED APPLICATION

This application is a continuation-in-part of application Ser. No. 08/371,714, filed Jan. 12, 1995 now abandoned.

FIELD OF INVENTION

The invention relates to dialkyl malonate/dialkyl acrylate-type refrigeration lubricants and more particularly relates to such lubricants having improved lubricity.

BACKGROUND

As disclosed in International Patent Application WO 93/13188 (Sabahi) and U.S. Pat. No. 5,399,279 (Sabahi et al.), oily Michael addition products of the dialkyl malonate/alkyl acrylate type are known to have general utility as lubricants and to be particularly valuable for use as lubricants in compositions containing fluorohydrocarbon refrigerants. Various conventional additives can be used in conjunction with these ester oil lubricants, but it would be desirable to find other additives capable of improving their lubricity without having an unduly deleterious effect on their miscibility with fluorohydrocarbon refrigerants.

SUMMARY OF INVENTION

It has now unexpectedly been found that hydrogenated oligomers of $C_4$–$C_{20}$ α-olefins improve the lubricity of Sabahi/Sabahi et al.-type ester oils even though they do not have this effect on other ester lubricants and, in fact, have been discovered to decrease the lubricity of other ester lubricants.

Thus, the invention resides in lubricant compositions comprising (A) about 80–99.9% by weight of at least one oil corresponding to the formula ROOC—$CH_2CH_2$—(ROOC—$CHCH_2$)$_m$—C(COOR)$_2$-($CH_2CHCOOR$)$_n$—$CH_2CH_2COOR$ in which the R's represent alkyl groups of 1–30 carbons, each of m and n is zero or a positive integer, and the sum of m and n in the molecules is an average of 0–30 and (B) correspondingly about 20–0.1% by weight of a hydrogenated oligomer of at least one $C_4$–$C_{20}$ α-olefin.

DETAILED DESCRIPTION

Ester oils which have their lubricity improved in accordance with the present invention may be any oils corresponding to the above formula. However, as in Sabahi and Sabahi et al., they are preferably esters in which the sum of m and n is at least one in at least 25% of the molecules; and, when the lubricant is to be used in a refrigeration composition containing a fluorohydrocarbon refrigerant, they are preferably esters in which at least 10% of the alkyl groups contain 1–4 carbons.

When not commercially available, the ester oils in which at least 10% of the alkyl groups contain 1–4 carbons may be prepared by the process of Sabahi et al., the teachings of which are incorporated herein by reference; and the other ester oils may be prepared by essentially the same process except for using reactants which result in the formation of esters in which fewer than 10% of the alkyl groups contain 1–4 carbons. Thus, in general, the ester oils are synthesized by:

(1) conducting a Michael reaction between one or more dialkyl malonate donors and one or more alkyl acrylate acceptors in proportions such as to form a mixture of ester products corresponding to the above formula in which the sum of m and n increases as the acceptor/donor ratio in the reaction mixture is increased to increase the number of acceptor moieties incorporated and (2) subjecting the resultant product or any portion thereof to a transesterification reaction when it is desired to replace at least some of the alkyl groups with higher alkyl groups.

As in Sabahi et at., the alkyl groups of the dialkyl malonates and alkyl acrylates employed as starting materials in the Michael reaction may be any alkyl groups containing 1–30 carbons (e.g., methyl, ethyl, propyl, isopropyl, butyl, isobutyl, t-butyl, pentyl, hexyl, heptyl, octyl, decyl, dodecyl, tetradecyl, hexadecyl, octadecyl, eicosyl, docosyl, tetracosyl, and triacontyl groups) but are preferably alkyls containing 1–10 carbons, more preferably methyl and/or ethyl, because of the greater reactivities of the compounds containing the lower alkyls. The presence in the final product of alkyls higher than those in the starting materials can be achieved by the aforementioned transesterification reaction, in which the Michael product is reacted with one or more substituted or unsubstituted alkanols containing 2–30 carbons, e.g., ethanol, chloroethanol, propanol, butanol, ethoxyethanol, ethylthioethanol, hexanol, bromohexanol, heptanol, octanol, decanol, eicosanol, tetracosanol, tricontanol, and mixtures thereof.

Particularly preferred ester oils for use in the practice of the invention are the methyl-butyl-hexyl esters corresponding to the above formula wherein at least 10%, preferably at least 20%, and more preferably at least 50% of the alkyls contain 1–4 carbons and wherein the sum of m and n in the molecules is an average of 0–30, preferably 0–10.

The hydrogenated oligomer employed to improve the lubricity of the ester oil may be any one or more of the known hydrogenated oligomers of $C_4$–$C_{20}$ α-olefins, but the preferred materials are the hydrogenated oligomers of U.S. Pat. Nos. 3,382,291, 3,149,178, and 3,725,498, the teachings of which are incorporated herein by reference. In general, these products are obtained by (1) oligomerizing one or more normal α-olefins containing about 4–20 carbons, preferably 6–12 carbons (most preferably 1-decene or a mixture of olefins wherein the chain length has a mean value of about 10) in the presence or absence of a catalyst, (2) removing dimers by fractional distillation, and (3) hydrogenating the residue.

The amount of hydrogenated oligomer mixed with the ester oil is such as to constitute at least about 0.1%, preferably about 0.5–20%, more preferably about 1–15%, and most preferably about 2–10% of the combined weights of the hydrogenated oligomer and ester oil. When the ester oil is to be used in other lubricant applications, it may sometimes be preferred to employ the higher concentrations of hydrogenated oligomers within these ranges. However, when the oil is to be utilized in a refrigeration composition containing a fluorohydrocarbon refrigerant, it may be preferred to use the lower concentrations of hydrogenated oligomer (i.e., concentrations such that it constitutes ≦15% of the combined weights of hydrogenated oligomer and ester oil) in order to avoid unduly lowering the miscibility of the lubricant and refrigerant.

As in Sabahi et al., lubricant compositions comprising the hydrogenated oligomer/ester oil mixtures may also contain additives of the types conventionally used in lubricants, such as oxidation resistance and thermal stability improvers, corrosion inhibitors, metal deactivators, viscosity index improvers, pour and/or floc point depressants, detergents, dispersants, antifoam agents, anti-wear agents, and extreme pressure resistance additives. Moreover, those used in the preferred refrigeration application, are used in conjunction with fluorohydrocarbon refrigerants—typically in amounts such that the ester oil/refrigerant weight ratio is in the range of 0.001–1/1, preferably 0.1–1/1.

Refrigerants with which the lubricant compositions are employed may be:

(1) refrigerants consisting of one or more fluorohydrocarbons, such as difluoromethane (R-32), 1,1,2,2,2-pentafluoroethane (R-125), 1,1,2,2-tetrafluoroethane (R-134), 1,1,1,2-tetrafluoroethane (R-134a), 1,1,1-trifluoroethane (R-143a), and 1,1-difluoroethane (R-152a) or (2) mixtures of one or more fluorohydrocarbons with one or more other refrigerants, e.g., hydrocarbons such as methane, ethane, propane (R-290), butane, ethylene, and propylene; and halocarbons and/or halohydrocarbons such as chlorotrifluoromethane, dichlorodifluoromethane, chloro difluoromethane (R-22), 1,2,2-trifluoro- 1,1,2-trichloroethane, 1,1-dichloro-2,2,2-trifluoroethane (R-123), 1,1-dichloro-1-fluoroethane, 1-chloro-2,2,2-trifluoroethane, 1-chloro-1,2,2,2-tetrafluoroethane (R-124), 1-chloro-1,1,2,2-tetrafluoroethane, and dichloromethane.

It is frequently preferred to employ R-134a as the sole refrigerant or to utilize a refrigerant blend such as a binary mixture of R-32 with R-125, R-152a, or R-134a; R-125/R-143a, R-290/R-134a, and R-22/R-152a binary blends; and ternary blends such as R-22/R-290/R-125, R-22/R-152a/R-124, k-32/R-125/R-134a, and R-125/R-143a/R-134a.

The invention is particularly advantageous in its providing a means of improving the lubricity of certain ester oils known to have good miscibility with fluorohydrocarbon refrigerants without unduly reducing that miscibility.

The following examples are given to illustrate the invention and are not intended as a limitation thereof. Unless otherwise specified, quantities mentioned in these examples are quantities by weight, miscibility was determined by subjecting a 4/1 mixture of refrigerant and lubricant to decreasing temperatures and recording as the phase separation point the temperature at which the first sign of cloudiness is observed, and the Falex wear performance data were determined in accordance with ASTM tests D-3233 and D-2670 at 30 minutes/400 lbs. ( 181.4 kg), using both steel/steel and aluminum/steel test specimens. Code names used in these examples should be understood as follows:

1. Each of the materials designated by an ES prefix is an oil prepared in accordance with Sabahi et al. by reacting an excess of methyl acrylate with dimethyl malonate and subjecting the resultant product mixture to transesterification with an equimolar mixture of butanol and hexanol. ES-25 has a viscosity of 25 $mm^2 \cdot s^{-1}$ at 40° C., and ES-100 has a viscosity of 100 $mm^2 \cdot s^{31\ 1}$ at 40° C.

2. Each of the materials designated by an HO prefix is a product which is sold by Albemarle Corporation under the tradename DURASYN, is a hydrogenated oligomer of one or more $C_4$–$C_{20}$ α-olefins having a mean chain length of about 10, and has a viscosity at 100° C. approximating the last digit of the numerical suffix— HO-162, e.g., having a viscosity of about 2 $mm^2 \cdot s^{-1}$ at 100° C., HO-170 having a viscosity of about 10 $mm^2 \cdot s^{-1}$ at 100° C., etc.

EXAMPLE 1

Determine the effect of hydrogenated α-olefin oligomers on the miscibility of ester lubricants with R-134a by preparing 4/1 mixtures of R-134a and an ester lubricant containing different amounts of hydrogenated oligomer, subjecting the mixtures to decreasing test temperatures of 70° C., 25° C., 20° C., 15° C., 10° C., 5° C., 0° C., –5° C., –10° C., –15° C., –20° C., –25° C., –30$_{20}$° C., and –35° C. until the first sign of cloudiness appears, and recording the phase separation point. The particular ES lubricants and HO additives employed, their proportions, and the phase separation points determined are shown in Table I.

TABLE I

| Lubricant | Additive | ES/HO | Phase Separation Point |
|---|---|---|---|
| ES-25 | HO-162 | 95/5 | –20° C. |
|  |  | 90/10 | 5° C. |
|  | HO-164 | 99.5/0.5 | –35° C. |
|  |  | 99/1 | –15° C. |
|  |  | 98/2 | 0° C. |
|  |  | 96/4 | 20° C. |
| ES-100 | HO-162 | 95/5 | –15° C. |
|  |  | 90/10 | 10° C. |
|  | HO-164 | 99.5/0.5 | –30° C. |
|  |  | 99/1 | –10° C. |
|  |  | 98/2 | 5° C. |
|  |  | 96/4 | 25° C. |

EXAMPLE 2

Blend ES-25 ester lubricant with various hydrogenated oligomers, determine the wear performance properties of the resultant blends using steel/steel test specimens, and compare those properties with the properties of ES-25 alone. The hydrogenated oligomers and amounts employed, as well as the test results, are shown in Table II.

TABLE II

Wear Performance of ES-25 Lubricant - Steel/Steel Specimens

| Additive | ES/HO | Wear Scar (mm) | Load Supported (psi) | Pin Wear (mm) | Pin Wt. Loss (g) |
|---|---|---|---|---|---|
| None | 100/0 | 0.567 | 25,961 | 0.037 | 0.0302 |
| HO-162 | 95/5 | 0.324 | 44,622 | 0.014 | 0.0114 |
|  | 90/10 | 0.375 | 38,592 | 0.009 | 0.0091 |
| HO-164 | 99.5/0.5 | 0.482 | 30,220 | 0.028 | 0.0289 |
|  | 99/1 | 0.585 | 24,833 | 0.037 | 0.0284 |
|  | 95/5 | 0.365 | 39,664 | 0.007 | 0.0144 |
|  | 90/10 | 0.377 | 38,592 | 0.004 | 0.0089 |
| HO-166 | 95/5 | 0.389 | 37,331 | 0.012 | 0.0156 |
|  | 90/10 | 0.451 | 32,088 | 0.011 | 0.0139 |
| HO-168 | 95/5 | 0.417 | 34,827 | 0.014 | 0.0174 |
|  | 90/10 | 0.407 | 35,698 | 0.023 | 0.0216 |
| HO-170 | 95/5 | 0.443 | 32,825 | 0.016 | 0.0178 |
|  | 90/10 | 0.415 | 35,040 | 0.007 | 0.0120 |

EXAMPLE 3

Repeat Example 2 except for using aluminum/steel test specimens. The hydrogenated oligomers and amounts employed, as well as the test results, are shown in Table III.

TABLE III

Wear Performance of ES-25 Lubricant - Aluminum/Steel Specimens

| Additive | ES/HO | Wear Scar (mm) | Load Supported (psi) | Pin Wear (mm) | Pin Wt. Loss (g) |
|---|---|---|---|---|---|
| None | 100/0 | 0.859 | 16,898 | 0.034 | 0.0338 |
| HO-162 | 95/5 | 0.781 | 18,605 | 0.014 | 0.0043 |
|  | 90/10 | 0.846 | 17,152 | 0.018 | 0.0053 |
| HO-164 | 99.5/0.5 | 0.798 | 18,190 | 0.018 | 0.0053 |
|  | 99/1 | 0.821 | 17,683 | 0.018 | 0.0029 |
|  | 95/5 | 0.793 | 18,306 | 0.019 | 0.0044 |
|  | 90/10 | 0.805 | 18,018 | 0.016 | 0.0038 |
| HO-166 | 95/5 | 0.895 | 16,226 | 0.021 | 0.0044 |
|  | 90/10 | 0.793 | 18,306 | 0.018 | 0.0039 |
| HO-168 | 95/5 | 0.773 | 18,788 | 0.018 | 0.0040 |
|  | 90/10 | 0.876 | 16,555 | 0.025 | 0.0052 |
| HO-170 | 95/5 | 0.814 | 17,849 | 0.016 | 0.0039 |
|  | 90/10 | 0.723 | 20,041 | 0.016 | 0.0035 |

EXAMPLE 4

Repeat Examples 2 and 3 except for using ES-100 as the ester lubricant. The hydrogenated oligomers and amounts employed, as well as the test results are shown in Table IV.

TABLE IV

Wear Performance of ES-100 Lubricant

| Additive | ES/HO | Wear Scar (mm) | Load Supported (psi) | Pin Wear (mm) | Pin Wt. Loss (g) |
|---|---|---|---|---|---|
| Part A - Steel/Steel Specimens ||||||
| None | 100/0 | 0.603 | 24,099 | 0.042 | 0.0529 |
| HO-162 | 95/5 | 0.463 | 31,382 | 0.035 | 0.0319 |
|  | 90/10 | 0.417 | 34,827 | 0.018 | 0.0150 |
| HO-164 | 99.5/0.5 | 0.505 | 28,846 | 0.011 | 0.0141 |
|  | 99/1 | 0.585 | 24,833 | 0.037 | 0.0284 |
| Part B - Aluminum/Steel Specimens ||||||
| None | 100/0 | 0.919 | 15,778 | 0.032 | 0.0138 |
| HO-162 | 95/5 | 0.848 | 17,152 | 0.023 | 0.0033 |
|  | 90/10 | 0.808 | 17,961 | 0.005 | 0.0036 |
| HO-164 | 99.5/0.5 | 0.877 | 16,555 | 0.021 | 0.0026 |
|  | 99/1 | 0.821 | 17,683 | 0.018 | 0.0029 |

The preceding examples demonstrate the effectiveness of hydrogenated α-olefin oligomers in increasing the lubricity of Sabahi et al.-type ester lubricants. The following example shows that similar results are not obtained when the same hydrogenated oligomers are mixed with other ester lubricants.

EXAMPLE 5

Repeat Examples 2 and 3 except for using as the ester lubricant HATCOL 2300, a pentaerythritol ester of mixed acids sold by the Hatco Chemical Corp. The hydrogenated oligomers and amounts employed, as well as the test results are shown in Table V.

TABLE V

Wear Performance of HATCOL 2300 Lubricant

| Additive | Ester/HO | Wear Scar (mm) | Load Supported (psi) | Pin Wear (mm) | Pin Wt. Loss (g) |
|---|---|---|---|---|---|
| Part A - Steel/Steel Specimens ||||||
| None | 100/0 | 0.506 | 28,702 | 0.025 | 0.0359 |
| HO-164 | 95/5 | 0.481 | 30,220 | 0.025 | 0.0457 |
|  | 90/10 | 0.507 | 28,702 | 0.025 | 0.0352 |
| HO-166 | 95/5 | 0.497 | 29,141 | 0.065 | 0.0505 |
|  | 90/10 | 0.424 | 34,201 | 0.035 | 0.0410 |
| HO-168 | 95/5 | 0.474 | 30,543 | 0.078 | 0.0652 |
|  | 90/10 | 0.466 | 31,211 | 0.067 | 0.0531 |
| HO-170 | 95/5 | 0.477 | 30,381 | 0.085 | 0.0565 |
|  | 90/10 | 0.467 | 31,041 | 0.032 | 0.0388 |
| Part B - Aluminum/Steel Specimens ||||||
| None | 100/0 | 0.543 | 26,689 | 0.002 | 0.0060 |
| HO-164 | 95/5 | 0.599 | 24,202 | 0.004 | 0.0066 |
|  | 90/10 | 0.625 | 23,218 | 0.012 | 0.0126 |
| HO-166 | 95/5 | 0.501 | 28,993 | 0.005 | 0.0072 |
|  | 90/10 | 0.601 | 24,099 | 0.002 | 0.0118 |
| HO-168 | 95/5 | 0.726 | 19,971 | 0.005 | 0.0012 |
|  | 90/10 | 0.700 | 20,694 | 0.011 | 0.0113 |
| HO-170 | 95/5 | 0.522 | 27,726 | 0.004 | 0.0055 |
|  | 90/10 | 0.576 | 25,161 | 0.004 | 0.0100 |

What is claimed is:

1. A lubricant composition comprising (A) about 99.9–80% by weight of at least one ester oil whose molecules correspond to the formula $ROOC-CH_2CH_2-(ROOC-CHCH_2)_m-C(COOR)_2-(CH_2CHCOOR)_n-CH_2CH_2COOR$ in which the R's represent alkyl groups of 1–30 carbons, each of m and n is zero or a positive integer, and the sum of m and n in the molecules is an average of 0–30 and (B) correspondingly about 0.1–20% by weight of a hydrogenated oligomer of at least one $C_4$–$C_{20}$ α-olefin.

2. The composition of claim 1 wherein the sum of m and n in the ester oil molecules is an average of 0–10.

3. The composition of claim 1 wherein the sum of m and n is at least one in at least 25% of the ester oil molecules.

4. The composition of claim 1 wherein at least 10% of the alkyl groups in the ester oil contain 1–4 carbons.

5. The composition of claim 1 wherein the α-olefin is a normal α-olefin containing 6–12 carbons.

6. The composition of claim 5 wherein the α-olefin is 1-decene.

7. The composition of claim 5 wherein the α-olefin has a mean chain length of 10 carbons.

8. The composition of claim 1 containing about 0.5–20% of the hydrogenated oligomer, based on the combined weights of the ester oil and hydrogenated oligomer.

9. The composition of claim 8 containing about 1–15% of the hydrogenated oligomer, based on the combined weights of the ester oil and hydrogenated oligomer.

10. A refrigeration composition comprising (A) a fluorohydrocarbon refrigerant, (B) as a refrigeration lubricant, at least one ester oil whose molecules correspond to the formula $ROOC-CH_2CH_2-(ROOC-CHCH_2)_m-C(COOR)_2-(CH_2CHCOOR)_n-CH_2CH_2COOR$ in which the R's represent alkyl groups of 1–30 carbons, at least 10% of which are alkyl groups of 1–4 carbons; each of m and n is zero or a positive integer; and the sum of m and n in the molecules is an average of 0–30, and (C) as a lubricity improver, about 0.1–20%, based on the combined weights of refrigerant lubricant and lubricity improver, of a hydrogenated oligomer of at least one $C_4$–$C_{20}$ α-olefin.

11. The composition of claim 10 wherein the sum of m and n in the ester oil molecules is an average of 0–10.

12. The composition of claim 11 wherein the sum of m and n is at least one in at least 25% of the molecules.

13. The composition of claim 10 wherein the α-olefin is a normal α-olefin containing 6–12 carbons.

14. The composition of claim 13 wherein the α-olefin is 1-decene.

15. The composition of claim 13 wherein the α-olefin has a mean chain length of 10 carbons.

16. The composition of claim 10 containing about 0.5–20% of the hydrogenated oligomer, based on the combined weights of refrigeration lubricant and lubricity improver.

17. The composition of claim 16 containing about 1–15% of the hydrogenated oligomer, based on the combined weights of refrigeration lubricant and lubricity improver.

18. The composition of claim 17 containing about 2–10% of the hydrogenated oligomer.

19. The composition of claim 10 wherein the refrigerant is 1,1,1,2-tetrafluoroethane.

* * * * *